(12) United States Patent
Previdi et al.

(10) Patent No.: US 7,466,661 B1
(45) Date of Patent: Dec. 16, 2008

(54) METHOD AND APPARATUS FOR ESTABLISHING ADJACENCY FOR A RESTARTING ROUTER DURING CONVERGENCE

(75) Inventors: Stefano Benedetto Previdi, Wavre (BE); Clarence Filsfils, Brussels (BE)

(73) Assignee: Cisco Technology, Inc., San Jose, CA (US)

( * ) Notice: Subject to any disclaimer, the term of this patent is extended or adjusted under 35 U.S.C. 154(b) by 724 days.

(21) Appl. No.: 10/668,655

(22) Filed: Sep. 22, 2003

(51) Int. Cl.
*H04L 12/28* (2006.01)
*H04L 12/56* (2006.01)

(52) U.S. Cl. ............. 370/254; 370/395.31; 370/395.32; 370/400

(58) Field of Classification Search ............ 370/242, 370/225, 232, 217, 252, 389
See application file for complete search history.

(56) References Cited

U.S. PATENT DOCUMENTS

| | | | |
|---|---|---|---|
| 5,243,592 A | 9/1993 | Perlman et al. | 370/252 |
| 5,253,248 A | 10/1993 | Dravida et al. | 370/228 |
| 5,265,092 A * | 11/1993 | Soloway et al. | 370/238 |
| 5,825,772 A | 10/1998 | Dobbins et al. | 370/396 |
| 5,999,286 A | 12/1999 | Venkatesan | 398/5 |
| 6,098,107 A | 8/2000 | Narvaez-Guarnieri et al. | |
| 6,278,687 B1 | 8/2001 | Hunneyball | 370/217 |
| 6,377,542 B1 | 4/2002 | Asprey | 370/222 |
| 6,449,279 B1 * | 9/2002 | Belser et al. | 370/397 |
| 6,473,421 B1 | 10/2002 | Tappan | |
| 6,507,577 B1 | 1/2003 | Mauger et al. | |
| 6,535,481 B1 | 3/2003 | Andersson et al. | 370/225 |
| 6,578,086 B1 | 6/2003 | Regan et al. | 702/242 |
| 6,590,868 B2 | 7/2003 | Shen | 370/242 |
| 6,668,282 B1 | 12/2003 | Booth et al. | 709/224 |
| 6,697,325 B1 | 2/2004 | Cain | 370/217 |
| 6,704,320 B1 | 3/2004 | Narvaez et al. | |
| 6,928,484 B1 | 8/2005 | Huai et al. | |
| 6,944,131 B2 | 9/2005 | Beshai et al. | 370/238.1 |
| 6,982,951 B2 | 1/2006 | Doverspike et al. | 370/217 |
| 6,996,065 B2 | 2/2006 | Kodialam et al. | |

(Continued)

OTHER PUBLICATIONS

Joint Technical Committee ISO/ETC JTC1, Internation Standard ISO/IEC 10589, "Internediate System to Intermediate System intra-domain routeing information exchange protocol for use in conjunction with the protocol for providing the connectionless-mode network service (ISO 8473)," 2nd Edition, Nov. 15, 2002.*

(Continued)

*Primary Examiner*—Edan Orgad
*Assistant Examiner*—Blanche Wong
(74) *Attorney, Agent, or Firm*—Hickman Palermo Troung & Becker LLP (57) ABSTRACT

A method and apparatus are disclosed for establishing adjacencies on a network, the method comprising, at a first node of the network, sending hello packets on the network and receiving hello packets from other nodes on the network on the basis of the received hello packets. The node then sends a link-state packet without adjacency information and without an overload bit set. The node then interrogates a link-state adjacency table and, when only one adjacency is listed in the link-state table, sends a further link-state packet with the adjacency information and the overload bit set. On convergence of a forward cache, the node sends a further link-state packet with adjacency information and without the overload bit set.

14 Claims, 5 Drawing Sheets

U.S. PATENT DOCUMENTS

| | | | |
|---|---|---|---|
| 7,058,016 B1 | 6/2006 | Harper | 370/238 |
| 7,065,059 B1 * | 6/2006 | Zinin | 370/312 |
| 7,113,481 B2 | 9/2006 | Elie-Dit-Cosaque et al. | 370/238 |
| 7,158,486 B2 | 1/2007 | Rhodes | |
| 7,248,579 B1 * | 7/2007 | Friedman | 370/389 |
| 7,349,427 B1 | 3/2008 | Canning et al. | |
| 2002/0093954 A1 | 7/2002 | Weil et al. | 370/389 |
| 2002/0116669 A1 | 8/2002 | Jain | 714/43 |
| 2002/0136223 A1 | 9/2002 | Ho | |
| 2002/0171886 A1 | 11/2002 | Wu et al. | |
| 2002/0172157 A1 | 11/2002 | Rhodes | |
| 2004/0001497 A1 | 1/2004 | Sharma | |
| 2004/0001508 A1 | 1/2004 | Zheng et al. | |
| 2004/0071089 A1 | 4/2004 | Bauer et al. | |
| 2004/0085894 A1 | 5/2004 | Wang et al. | 370/216 |
| 2005/0031339 A1 | 2/2005 | Qiao et al. | 398/4 |
| 2005/0038909 A1 | 2/2005 | Yoshiba et al. | |
| 2005/0097219 A1 | 5/2005 | Goguen et al. | |
| 2007/0011284 A1 | 1/2007 | Le Roux et al. | 709/223 |

OTHER PUBLICATIONS

U.S. Appl. No. 10/685,622, Final Office Action mailed Feb. 20, 2008, 18 pages.

M. Leelanivas, et al., "Graceful Restart Mechanism for Label Distribution Protocol," Feb. 2003, Network Working Group, Request for Comments: 3478, http://rfc3478.x42.com, data retrieved Apr. 28, 2004, pp. 1-11.

R. Balay, et al., "IS-IS Mesh Groups," Oct. 2000, Network Working Group, Request for Comments: 2973, pp. 1-8, data retrieved Apr. 28, 2004.

M. Shand, et al., Restart signaling for IS-IS, draft-ietf-isis-restart-05.txt, Jan. 2004, Network Working Group, Internet Draft, http://www.ietf.org/internet-drafts/draft-ietf-isis-restart-05.txt, data retrieved Apr. 28, 2004, pp. 1-20.

Amir Hermelin, et al., Extending the Number of IS-IS LSP Fragments Beyond the 256 Limit, draft-ietf-isis-lsp-frags-02.txt, Network Working Group, Internet Draft, http://www.ietf.org/internet-drafts/drafts-ietf-isis-ext-lsp-frags-02.txt, data retrieved Apr. 28, 2004, pp. 1-12.

M. Shand, et al., "Restart signaling for IS-IS, draft-ietf-isis-restart-04.txt," Jul. 2003, Network Working Group, Internet Draft, http://vesuvio.ipv6.tilab.com/internet-drafts/draft-ietf-isis-restart-04.txt, data retrieved Apr. 28, 2004, pp. 1-18.

International Searching Authority, International Search Report, PCT/US04/33827, dated Mar. 28, 2005, 8 pages.

Current Claims, PCT/US04/33827, 6 pages, dated Mar. 28, 2005.

Wang, Zheng et al., "Shortest Path First with Emergency Exits," ACM 089791-405-8/90/0009/0166, 1990, pp. 166-176.

* cited by examiner

| System Id | SNPA | Interface | State | Holdtime | Type | Protocol |
|---|---|---|---|---|---|---|
| router# | | | | | | |
| 000.0000.0007 | aa00.0400.6408 | Ethernet0 | Init | 291 | IS | ES-IS |
| Area Address(es): 47.0005.80FF.F500.0000.0003.0020 | | | | | | |
| 0000.0C00.0C35 | 0000.0c00.0c36 | Ethernet1 | Up | 94 | L1 | IS-IS |
| Area Address(es): 47.0004.004D.0001 39.0001 | | | | | | |
| 0800.2B16.24EA | aa00.0400.2d05 | Ethernet0 | Up | 9 | L1L2 | IS-IS |
| Area Address(es): 47.0004.004D.0001 | | | | | | |
| 0800.2B14.060E | aa00.0400.9205 | Ethernet0 | Up | 1651 | ES | ES-IS |
| Area Address(es): 49.0040 | | | | | | |
| 0000.0C00.3E51 | *HDLC* | Serial1 | Up | 27 | L2 | IS-IS |
| Area Address(es): 39.0004 | | | | | | |
| 0000.0C00.62E6 | 0000.0c00.62e7 | Ethernet1 | Up | 26 | L1 | IS-IS |
| Area Address(es): 47.0004.004D.0001 | | | | | | |
| oA00.0400.2D05 | aa00.0400.2d05 | Ethernet0 | Init | 29 | IS | ES-IS |
| Area Address(es): 47.0004.004D.0001 | | | | | | |

METHOD AND APPARATUS FOR ESTABLISHING ADJACENCY FOR A RESTARTING ROUTER DURING CONVERGENCE

FIELD OF THE INVENTION

The present invention generally relates to network routing. The invention relates more specifically to a method and apparatus for establishing adjacency for a restarting router during convergence.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Internet protocol relates to a network layer protocol in the TCP/IP stack offering a connectionless inter-network service. Various routing protocols have been used to implement such networks. In particular, Link State Protocols have proved popular in which data is transmitted using Link State Packets. An example of such a protocol is the Intermediate System-to-Intermediate System (IS-IS) protocol.

A network comprises a plurality of nodes connected together. Some nodes represent end systems (such as printers, fax machines, telephones, PC's etc) whereas other nodes represent network devices (e.g. switches, routers etc). Data packets are sent around the network from a source to a destination in accordance with routing information shared among the nodes of the network. As the network comprises a plurality of interconnected nodes, the network is fairly robust. Should a node fail for any reason, the network dynamically configures to re-route data so as to avoid the failed node.

Discovery messages, such as Hello messages, provide a mechanism by which nodes on a network may continually indicate their presence. The "Hello" packets are used to establish routing adjacencies between directly connected routers and for the purpose of exchanging routing information packets.

A link can be thought of as an interface on a router. The state of the link is a description of that interface and of its relationship to its neighboring routers. A description of the interface would include, for example, the IP address of the interface, the mask, the type of network it is connected to, the router connected to that network and so on. The collection of all these link-states form a link-state database. Link state protocols use a link state algorithm to build and calculate the shortest path to all known destinations. The algorithms themselves are quite complicated but the following provides a high level simplified way of looking at the various steps of a link state algorithm. Upon initialization or due to any changing routing information, a router will generate a link state advertisement. This advertisement represents the collection of all link states on that router. All routers exchange link states by means of flooding. Each router that receives a link state update, stores a copy in its link state database and then propagates the update to other routers. After the database of each router is completed, the router will calculate the shortest path tree to all designations and use this information to form an IP routing table.

In IS-IS, when a link or a node fails and is subsequently repaired, the routers involved with the repaired part of the network then have to re-establish an IS-IS adjacency over that link. This is achieved by the router(s) transmitting Hello packets and receiving in response Hello packets from their neighboring nodes. The router then generates an adjacency table with information received from the neighboring nodes and updates its Link-State Protocol data unit (LSP) and floods it throughout the network area. Link-state routing protocols mean that each router in the area, after having received a LSP, will compute a Shortest Path First and update its IP routing table.

The LSP as sent by the router advertises adjacency information regardless of whether the routers are effectively able to forward traffic. When a router or a link has been down, there are additional delays whilst the routers obtain full knowledge of the forwarding cache and until the Border Gateway Protocol (BGP) has also converged (if needed). Until these occur, the router is not in a state to forward data sent to it for onward routing.

The IS-IS protocol already includes some mechanisms to prevent the router being used as a transit node in another router's table until its convergence is finished. Typically the overload bit LSPDBOL is set whilst the system is converging. At the same time the adjacency of the LSP is advertised. However, this allows a receiving router to compute routes towards a re-starting node before such a node is ready for data.

When a router restarts, it originates its LSP with a sequence number of 1. As there will be old versions of the old LSP for the restarting router already existing in the network, its neighbors will flood back the old copy of the restarting router LSP (if any) with the last sequence number used before the restart. LSPs are kept in link state databases for a significant amount of time. Therefore the LSP of a restarting router will survive in the database of other routers in the network. On receipt of the old copy of the restarting router LSP, the restarting router can determine the next sequence number it has to use and regenerates its LSP with a sequence number higher than the one received on the old copy of its LSP. Such LSP exchange takes time and until it is finished all routers in the area may compute their SPF using an old copy of the restarting router LSP. Therefore routers in the network may route data to the restarting router before it is fully converged.

Based on the foregoing, there is a clear need for a method of preventing routers in the network from routing data to a restarting router before the router has fully converged.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for establishing adjacency for a restarting router during convergence is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
  General Overview
  Structural and Functional Overview
  Method of routing data to a restarting router during convergence
  Implementation Mechanisms—Hardware Overview
  Extensions and Alternatives

1.0 GENERAL OVERVIEW

The needs identified in the foregoing Background, and other needs and objects that will become apparent for the following description, are achieved in the present invention, which comprises, in one aspect, a method for establishing adjacencies on a network. A first node of the network, for which adjacencies need to be established (for instance because the node is re-starting) sends hello packets out onto the network. In response, the node receives hello packets from other nodes on the network on the basis of the hello packets sent by the first node. The first node then sends a link-state packet without adjacency information and without an overload bit set. The first node then interrogates a link-state adjacency table and, when only one adjacency is listed in the link-state table, sends a further link-state packet with the adjacency information and the overload bit set. When a forward cache has converged, the node sends a further link-state packet with adjacency information and without the overload bit set.

In other aspects, the invention encompasses a computer apparatus and a computer-readable medium configured to carry out the foregoing steps.

2.0 STRUCTURAL AND FUNCTIONAL OVERVIEW

One example of a networking protocol is the Intermediate System-to-Intermediate System (IS-IS) protocol. This protocol uses Link State PDUs (LSPs) which enable fast convergence with large scalability. IS-IS will be used to illustrate the method and apparatus although it is not essential that this protocol be used.

An internetwork comprises a plurality of interconnected sites. Traffic between sites is routed from the source to a destination via nodes of the network. Due to various factors (for instance excessive network traffic, hardware failure or software failure), nodes may enter a failure mode, during which time data routed to that node is not routed onwards by that node.

Figure 1:
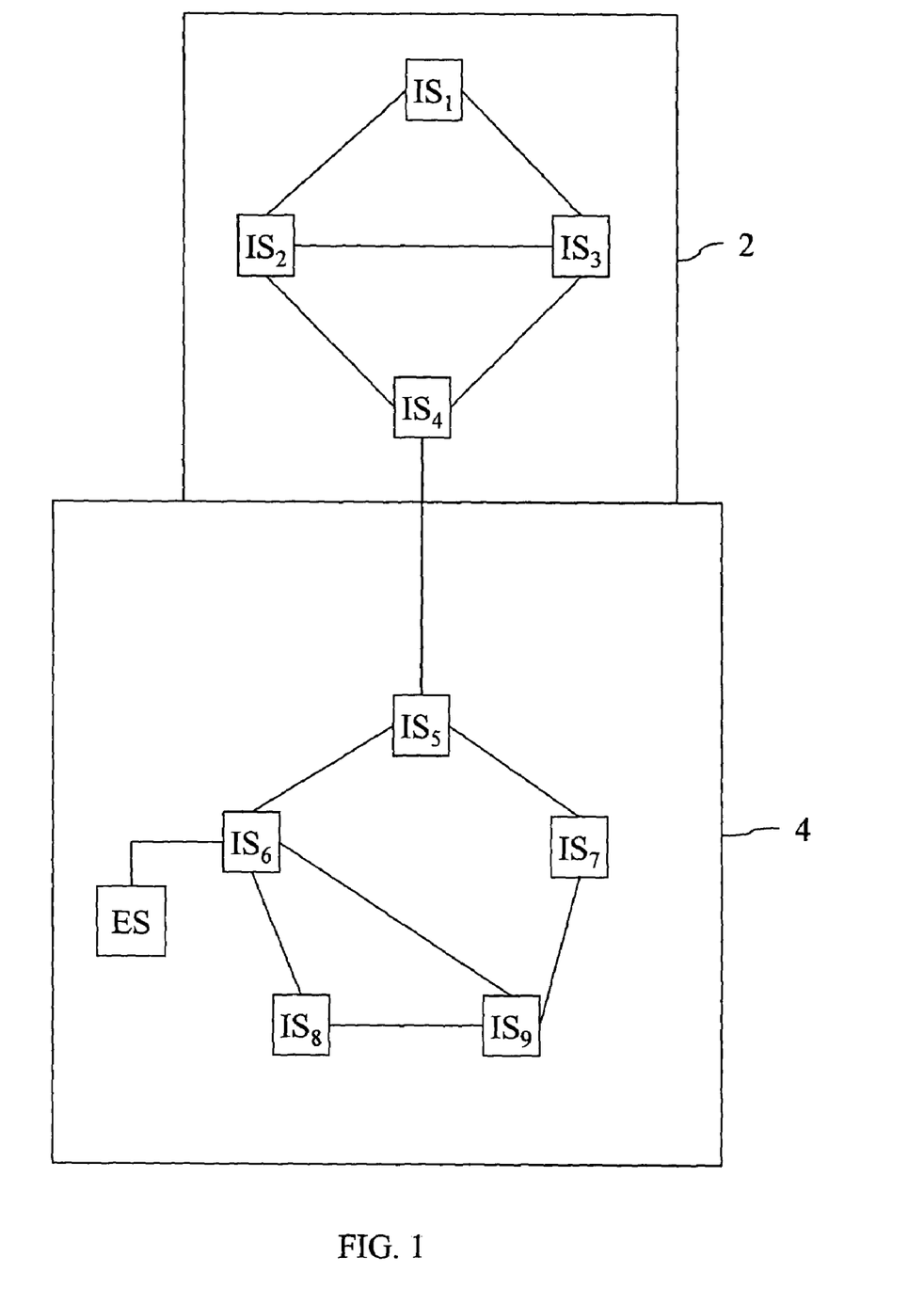
FIG. 1 is a block diagram of an embodiment of a network.

FIG. 1 shows a simple block diagram illustrating an internetwork. In the network shown, the network is divided administratively into two areas 2, 4. Each area includes at least one intermediate system (IS). An example of an IS is a router. Attached to any of the routers are hosts known as End Systems (ESs). Generally a two level hierarchy is adopted. Routing within an area is referred to as level 1 routing. Routing between areas is referred to as level 2 routing. A level 2 IS (such as IS4) keeps track of the paths to destination areas. A level 1 IS (e.g. IS1) keeps track of the routing within its own area. For a packet destined for another area, a level 1 IS sends the packet to the nearest level 2 IS in its own area (e.g. IS4), regardless of the destination area. The packet travels via level 2 routing to the destination area where it then may travel via level 1 routing to the destination.

To maintain the integrity of the network, each node of the network needs to be continually informed of another node of the network to enable routing. This is generally achieved by nodes emitting discovery messages (known as Hellos) and monitoring for responses to these Hello messages.

Each node includes a link state database which includes link state information for the network. Routers send Hello packets out to all interfaces to discover neighbors and establish adjacencies. Routers sharing a common data link will become neighbors if their Hello packets contain information that meets the criteria for forming an adjacency. The main criteria are matching authentication, IS type and MTU size. Routers then build a link state packet (LSP) based upon their local interfaces and prefixes learnt from other adjacent routers. Generally the routers then flood their LSPs to all adjacent neighbors except the neighbor from who they received the same LSP. The routers then construct a link state database from these LSPs. A shortest path tree (SPT) is then calculated by each IS and from this SPT a routing table is built.

Figure 2:
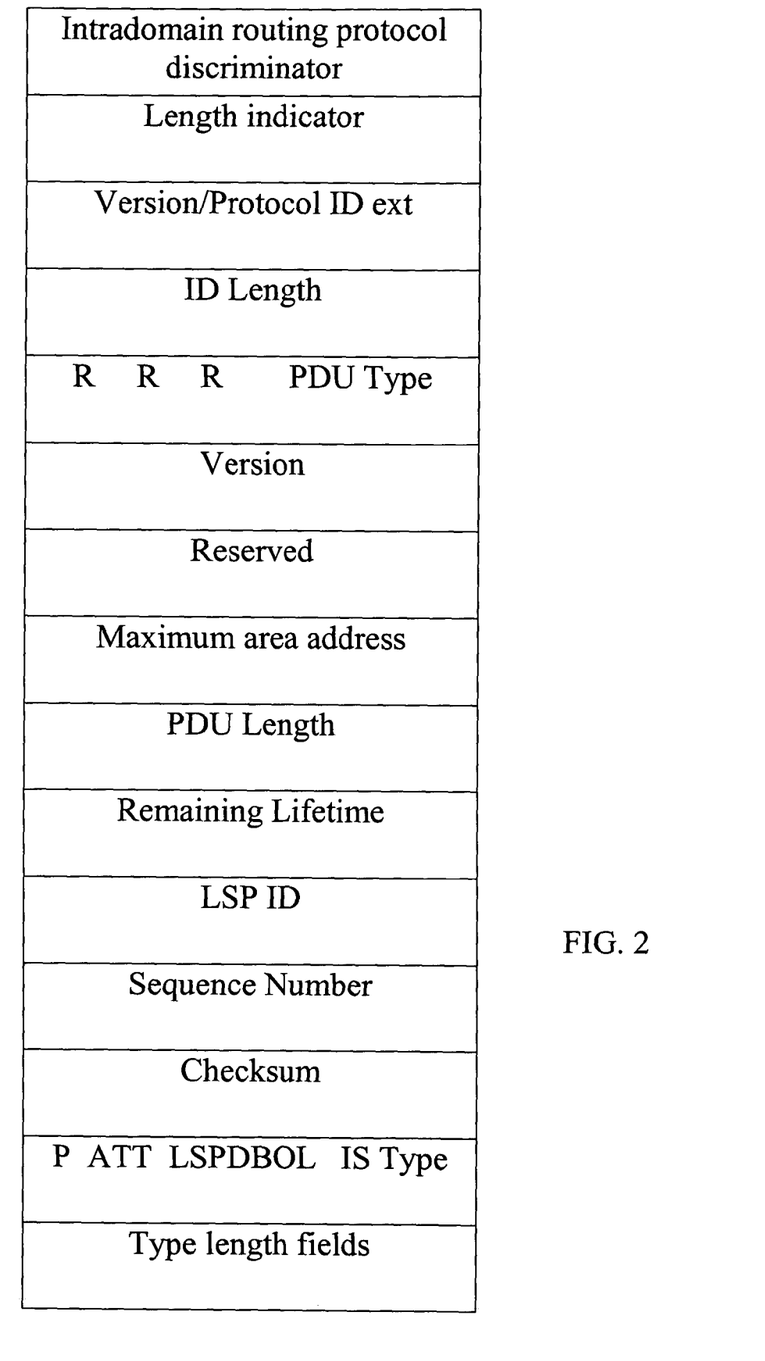
FIG. 2 shows an example of a format of a Link State Protocol packet.

An example of a LSP packet format is shown in FIG. 2. As can be seen with reference to FIG. 2, the LSP includes the following fields:
  Intradomain routing protocol discriminator—This is the network layer identifier. A binary value of 10000011 indicates that the network is an IS-IS network.
  Length indicator—This is the length of the fixed header.
  Version/Protocol ID ext—The version number of the protocol and the extension number of the protocol, if applicable.
  ID length—Length of the system ID field; this is the same for all nodes in the domain.
  PDU Type—Protocol Data Unit (PDU) types (e.g. Level 1 IS and level 2 IS)
  Version—The version number of the protocol.
  Reserved—unused at the time of writing.
  Maximum area address—Number of address areas permitted for the IS area.
  PDU Length—Length of the entire PDU, fixed header and any Type-Length-Value (TLVs) fields.
  Remaining Lifetime—Time in seconds before the LSP expires.
  LSP ID—System ID, pseudocode and LSP fragmentation number.
  Sequence number—updated sequentially by the originator each time an LSP is sent.
  Checksum—Computed from Source ID to end of PDU.
  P—Partition—indicates whether originator of LSP supports partition repair.
  ATT—Attached—when any bit set, indicates the originator is attached to another area using a referred metric.
  LSPDBOL—LSP Database Overload. When set, this indicates the originator's LSP database is overloaded and should be circumvented in path calculations to other destinations.
  IS Type—indicates Level 1 or Level 2 IS.
  Type length fields—variable fields which store any TLV information.

Where a node fails and is then subsequently repaired, it will be necessary for that node to acquire the LSPs from its neighbors so that it can rebuild its link state database. While the node acquires the LSPs from neighboring nodes, there will be a period of time during which the node's link state database is not complete. Clearly this may cause problems if a packet is routed to that node since the node may not yet have received information relating to how a packet should be routed. It is therefore important to avoid sending data to a node whilst it is in this transition state, but it is desirable to be able to transit data via this node but not via all its interfaces.

3.0 METHOD FOR ESTABLISHING ADJACENCY FOR A RESTARTING ROUTER DURING CONVERGENCE

Figure 3:
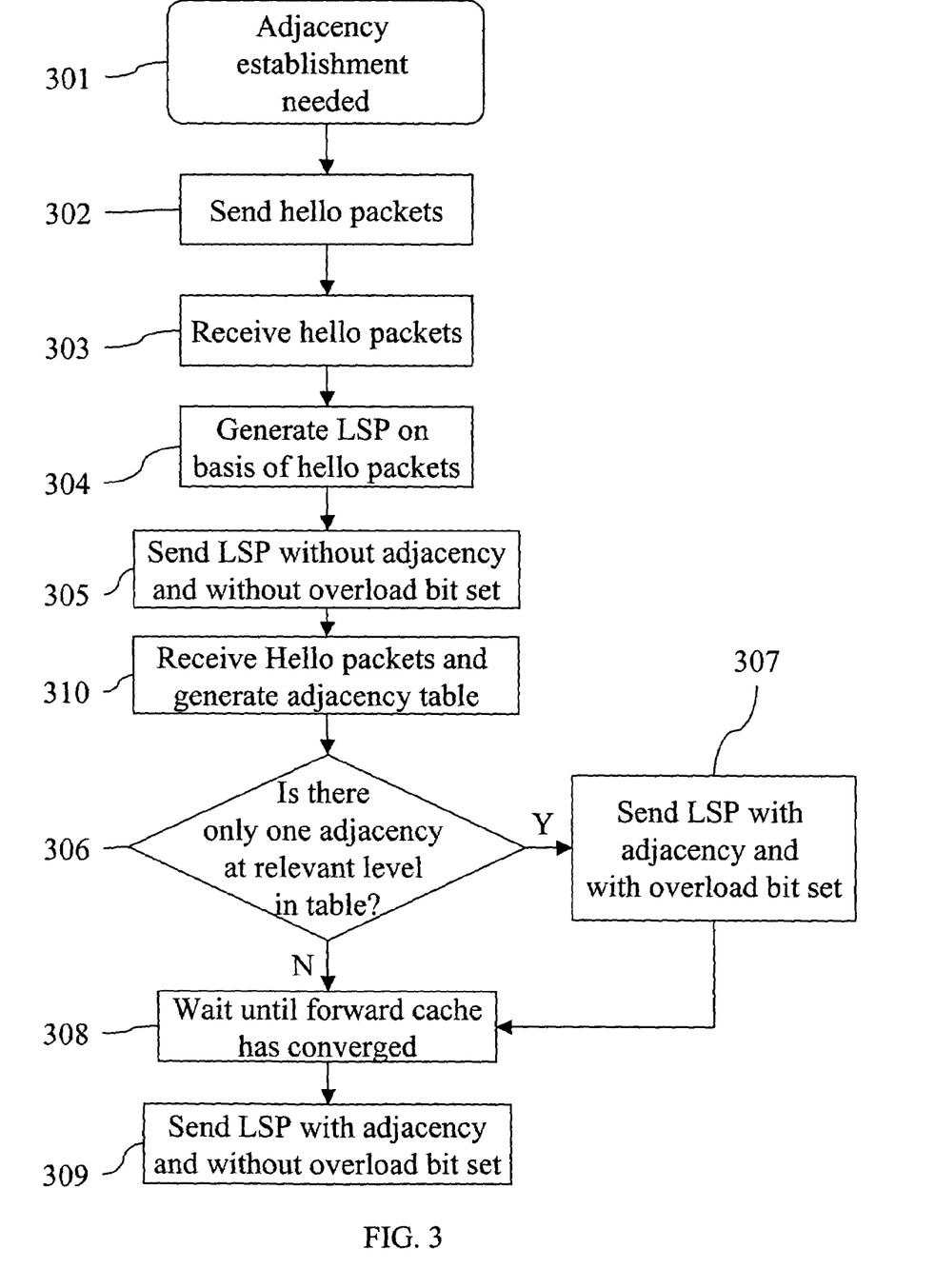
FIG. 3 is a flow diagram which illustrates a high level overview of one embodiment of a method for re-establishing adjacency.

FIG. 3 shows a flow diagram which illustrates a high level overview of one embodiment of a method for re-establishing adjacency in a network. First (301) it establishes that adjacency establishment is needed. This can be based on a number of determining factors, for instance all the entries in the link state database having no remaining lifetime, the knowledge that a Line Card (LC) Forwarding Information Base (FIB) is being downloaded, a router restart or a LC restart. Once the node has established that adjacency establishment is needed, the node transmits Hello packets through the network (302). These Hello messages are used by routers to detect neighbors and form adjacencies. The router then monitors for any received Hello packets (303). These Hello packets are received from network nodes that have received the Hello packets sent by the router.

On receipt of the Hello packets, the router generates a link state packet (304). The LSP is generated (304) without setting the overload bit LSPDBOL and without including the adjacency information. Typically in IS-IS the adjacency information is advertised in the field TLV-2 or TLV-22. The field is omitted when no adjacency information is advertised. This LSP is then flooded throughout the network (305).

By advertising a new LSP without the adjacency information, the whole network is informed that the node is not ready to receive traffic from the particular adjacency. If the node under repair has undergone an event which means that the node does not know the next sequence number to use, this also allows the node to capture the correct sequence number that it should be using. The node under repair generates a LSP with a sequence number of 1. When a receiving neighbor node receives the LSP with a sequence number of 1, the receiving neighbor node will transmit back to the node under repair an LSP with a higher sequence number and the node under repair will then know which is the next sequence number to be used. This next sequence number is then used in subsequent LSP generation.

Figure 4:
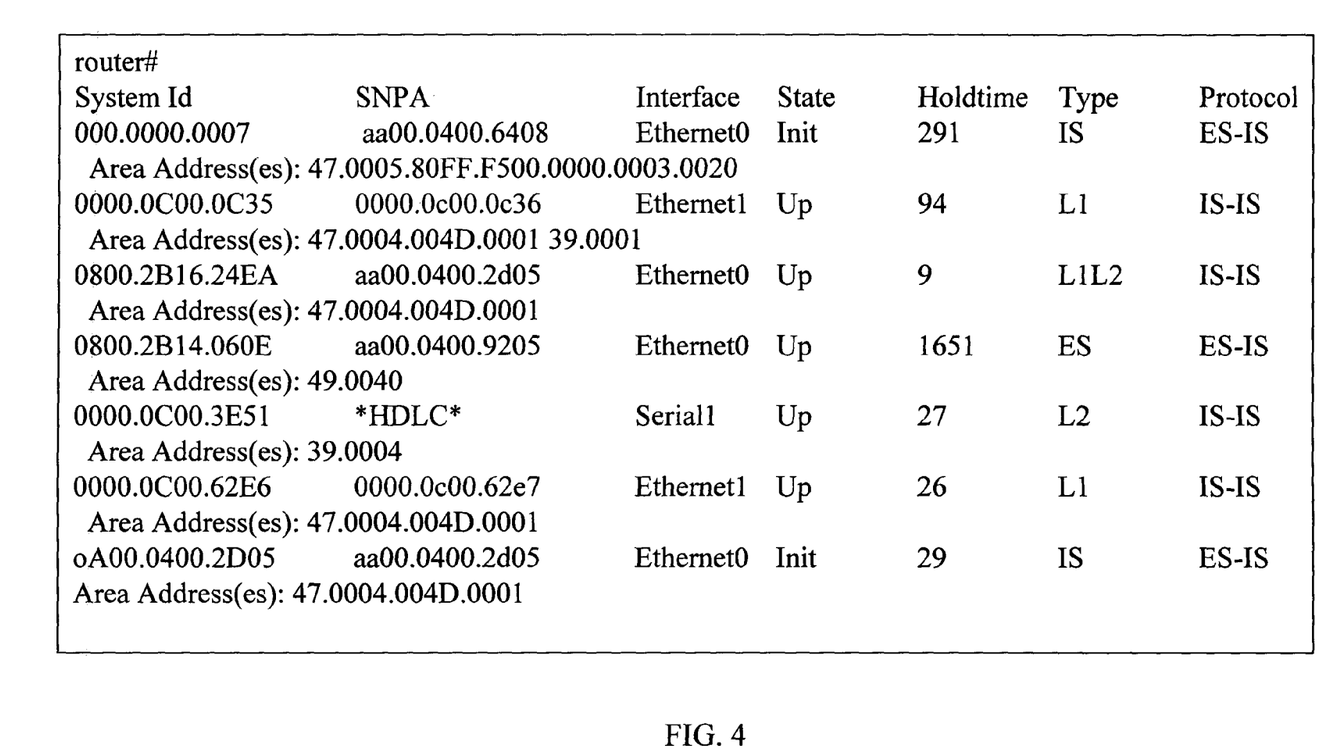
FIG. 4 shows an example of an adjacency table showing the IS-IS Level 1 and Level 2 LSP.

On receipt of subsequent hello packets, the node under repair generates an adjacency table (310), an example of which is shown in FIG. 4. The router then determines (306) if the newly established adjacency is the only one in the IS-IS adjacency table or if there are other adjacencies but for IS-IS levels other than the newly established one. If the only adjacency in the adjacency table is the adjacency of the restarting node this indicates that the router has been isolated from the rest of the network and therefore BGP sessions have got lost. If the newly established adjacency is the only one in the adjacency table, the LSP is sent with the overload bit LSPDBOL set and with the new adjacency advertised (307). This allows routers in the area to route around the router under repair (owing to the overload bit being set) but allows BGP sessions to be established with the router under repair (owing to the adjacency information being advertised). This allows for BGP convergence.

If there is more than one adjacency in the adjacency table this indicates that the router is connected to the rest of the network and that BGP sessions have stayed alive. Therefore the restarting node does not need to send a new LSP with the adjacency information advertised but the overload bit set.

In either case, when the forwarding cache has converged (308), the router then floods a new version of its LSP throughout the network (309) with the adjacency information and without the overload bit LSPDBOL set. Cache convergence may be indicated by a signal from the process in charge of the population of the cache.

Steps 306 and 307 are used mainly when a router is restarting or when the router has been completely disconnected from the rest of the network. Steps 306 and 308 are mainly used when the node under repair requires convergence of the IGP, BGP and forwarding cache prior to accepting and sending traffic from or to a newly restarted interface of the node under repair.

The method described has the advantage that the IS-IS protocol behavior does not require any modification. The modifications relate to how a router re-originates its Link-State PDU (LSP) with the new adjacency information.

4.0 IMPLEMENTATION MECHANISMS—HARDWARE OVERVIEW

Figure 5:
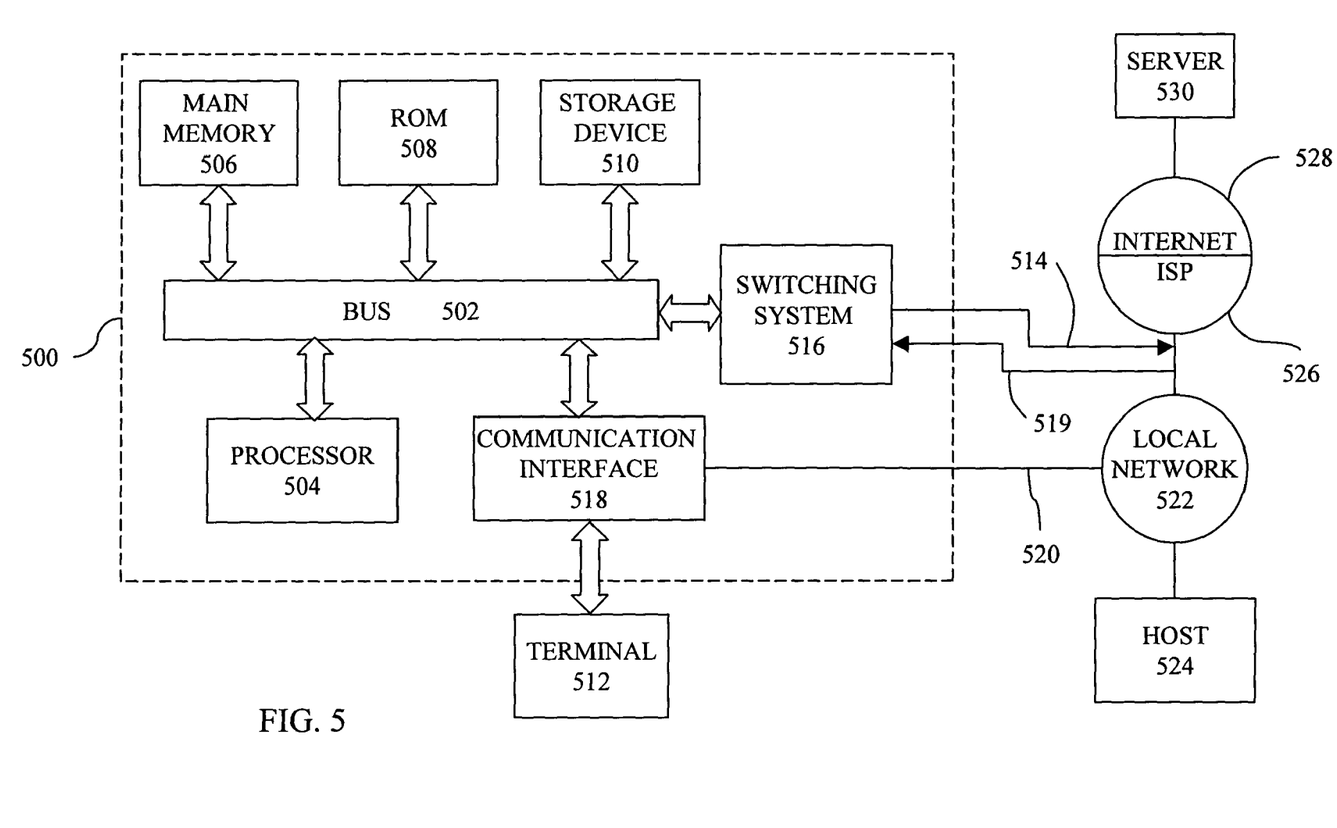
FIG. 5 is a block diagram that illustrates a computer system upon which an embodiment may be implemented.

FIG. 5 is a block diagram that illustrates a computer system 500 upon which an embodiment of the invention may be implemented. The preferred embodiment is implemented using one or more computer programs running on a network element such as a router device. Thus, in this embodiment, the computer system 500 is a router.

Computer system 500 includes a bus 502 or other communication mechanism for communicating information, and a processor 504 coupled with bus 502 for processing information. Computer system 500 also includes a main memory 506, such as a random access memory (RAM), flash memory, or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk, flash memory or optical disk, is provided and coupled to bus 502 for storing information and instructions.

A communication interface 518 may be coupled to bus 502 for communicating information and command selections to processor 504. Interface 518 is a conventional serial interface such as an RS-232 or RS-422 interface. An external terminal 512 or other computer system connects to the computer system 500 and provides commands to it using the interface 518. Firmware or software running in the computer system 500 provides a terminal interface or character-based command interface so that external commands can be given to the computer system.

A switching system 516 is coupled to bus 502 and has an input interface 514 and an output interface 519 to one or more external network elements. The external network elements may include a local network 522 coupled to one or more hosts 524, or a global network such as Internet 528 having one or more servers 530. The switching system 516 switches information traffic arriving on input interface 514 to output interface 519 according to pre-determined protocols and conventions that are well known. For example, switching system 516, in cooperation with processor 504, can determine a destination of a packet of data arriving on input interface 514 and send it to the correct destination using output interface 519. The destinations may include host 524, server 530, other end stations, or other routing and switching devices in local network 522 or Internet 528.

The invention is related to the use of computer system 500 for re-establishing adjacencies on a network. According to one embodiment of the invention, this is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Communication interface 518 also provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for routing data to a restarting router during convergence as described herein.

The received code may be executed by processor 504 as it is received, and/or stored in storage device 510, or other non-volatile storage for later execution. In this manner, computer system 500 may obtain application code in the form of a carrier wave.

5.0 EXTENSIONS AND ALTERNATIVES

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of establishing adjacencies on a network, the method comprising, at a first node of the network,
sending one or more hello packets on the network;
receiving one or more hello packets from other nodes on the network on the basis of the sent hello packets;
in response to receiving the one or more hello packets, sending a first link-state packet in Intermediate System-to-Intermediate System protocol;
wherein the first link-state packet includes a field for an overload bit;
wherein the overload bit in said field is not set;
wherein the first link-state packet comprises no adjacency information;
interrogating a link-state adjacency table and, when only one adjacency is listed in the link-state table, sending a second link-state packet in Intermediate System-to-Intermediate System protocol;
wherein the second link-state packet comprises adjacency information and an overload bit that is set; and
on convergence of a forward cache, sending a further link-state packet in Intermediate System-to-Intermediate System protocol;
wherein the further link-state packet comprises adjacency information and an overload bit that is not set.

2. A method according to claim 1 wherein the method is initiated when the first node is in a restart node.

3. A method according to claim 2 wherein the restart node is a line card restart, a router restart or a download of a forwarding information base.

4. A method according to claim 1 wherein the network uses Intermediate System-to-Intermediate System protocol and wherein the adjacency information is advertised in a Type Length Variable field of the link-state packet.

5. A method of re-establishing adjacency in an inter-networked system, the method comprising:
  i) determining that adjacency establishment is required;
  ii) transmitting a message to discover neighboring network elements;
  iii) receiving one or more messages from neighboring network elements; and
  iv) in response to the one or more received messages, generating a first link-state packet in Intermediate System-to-Intermediate System protocol;
    wherein the first link-state packet includes a field for an overload bit;
    wherein the overload bit in said field is not set;
    wherein the first link-state packet comprises no adjacency information;
  v) sending the first link-state packet;
  vi) interrogating a link-state adjacency table and, when only one adjacency is listed in the link-state table, sending a second link-state packet in Intermediate System-to-Intermediate System protocol;
    wherein the second link-state packet comprises adjacency information and an overload bit that is set; and
  vii) on convergence of a forward cache, sending a further link-state packet in Intermediate System-to-Intermediate System protocol;
    wherein the further link-state packet comprises adjacency information and an overload bit set that is not set.

6. A computer-readable storage medium storing one or more sequences of instructions for establishing adjacencies on a network, which instructions, when executed by one or more processors, cause the one or more processors to carry out the steps of:
  sending one or more hello packets on the network;
  receiving one or more hello packets from other nodes on the network on the basis of the sent hello packets;
  in response to receiving the one or more hello packets, sending a first link-state packet in Intermediate System-to-Intermediate System protocol;
    wherein the first link-state packet includes a field for an overload bit;
    wherein the overload bit in said field is not set;
  wherein the first link-state packet comprises no adjacency information;
    interrogating a link-state adjacency table and, when only one adjacency is listed in the link-state table, sending a second link-state packet in Intermediate System-to-Intermediate System protocol;
    wherein the second link-state packet comprises adjacency information and an overload bit that is set; and
  on convergence of a forward cache, sending a further link-state packet in Intermediate System-to-Intermediate System protocol;
    wherein the further link-state packet comprises adjacency information and an overload bit that is not set.

7. A computer-readable storage medium as claimed in claim 6 further comprising instructions which, when executed by the one or more processors, cause the one or more processors to carry out the steps of:
  initiating the method when in a restart node.

8. A computer-readable storage medium as claimed in claim 6 further comprising instructions which, when executed by the one or more processors, cause the one or more processors to carry out the steps of:
  initiating the method when in a restart mode comprising one or more of the following: a line card restart, a router restart or a download of a forwarding information base.

9. A computer-readable storage medium as claimed in claim 6 wherein the network uses Intermediate System-to-Intermediate System protocol and wherein the adjacency information is advertised in a Type Length Variable field of the link-state packet.

10. A computer-readable storage medium storing one or more sequences of instructions for re-establishing adjacency in an inter-networked system, which instructions, when executed by one or more processors, cause the one or more processors to carry out the steps of:
  i) determining that adjacency establishment is required;
  ii) transmitting a message to discover neighboring network elements;
  iii) receiving one or more messages from neighboring network elements; and
  iv) in response to the one or more received messages, generating a first link-state packet in Intermediate System-to-Intermediate System protocol;
    wherein the first link-state packet includes a field for an overload bit;
    wherein the overload bit in said field is not set;
    wherein the first link-state packet comprises no adjacency information;
  v) sending the first link-state packet;
  vi) interrogating a link-state adjacency table and, when only one adjacency is listed in the link-state table, sending a second link-state packet in Intermediate System-to-Intermediate System protocol;
    wherein the second link-state packet comprises adjacency information and an overload bit that is set; and
  vii) on convergence of a forward cache, sending a further link-state packet in Intermediate System-to-Intermediate System protocol;
    wherein the further link-state packet comprises adjacency information and an overload bit set that is not set.

11. Apparatus for establishing adjacencies on a network, the apparatus comprising:
  means for sending one or more hello packets on the network;
  means for receiving one or more hello packets from other nodes on the network on the basis of the sent hello packets;
  means for, in response to receiving the one or more hello packets, sending a first link-state packet in Intermediate System-to-Intermediate System protocol;
    wherein the first link-state packet includes a field for an overload bit;
    wherein the overload bit in said field is not set;
    wherein the first link-state packet comprises no adjacency information;
  means for interrogating a link-state adjacency table and, when only one adjacency is listed in the link-state table, sending a second link-state packet in Intermediate System-to-Intermediate System protocol;
    wherein the second link-state packet comprises adjacency information and an overload bit that is set; and on convergence of a forward cache, means for sending a further link-state packet in Intermediate System-to-Intermediate System protocol;
    wherein the further link-state packet comprises adjacency information and an overload bit that is not set.

12. Apparatus for re-establishing adjacency in an internetworked system, the apparatus comprising:
  i) means for determining that adjacency establishment is required;
  ii) means for transmitting a message to discover neighboring network elements;
  iii) means for receiving one or more messages from neighboring network elements; and
  iv) means for in response to the one or more received messages, generating a first link-state packet in Intermediate System-to-Intermediate System protocol;
    wherein the first link-state packet includes a field for an overload bit;
    wherein the overload bit in said field is not set;
    wherein the first link-state packet comprises no adjacency information;
  v) means for sending the first link-state packet;
  vi) means for interrogating a link-state adjacency table and, when only one adjacency is listed in the link-state table, sending a second link-state packet in Intermediate System-to-Intermediate System protocol;
    wherein the second link-state packet comprises adjacency information and an overload bit that is set; and
  vii) on convergence of a forward cache, means for sending a further link-state packet in Intermediate System-to-Intermediate System protocol;
    wherein the further link-state packet comprises adjacency information and an overload bit set that is not set.

13. An apparatus for establishing adjacencies on a network, the apparatus comprising:
  a network interface that is coupled to the network for receiving one or more packet flows therefrom;
  a processor;
  one or more stored sequences of instructions which, when executed by the processor, cause the processor to carry out the steps of:
    sending one or more hello packets on the network;
    receiving one or more hello packets from other nodes on the network on the basis of the sent hello packets;
    in response to receiving the one or more hello packets, sending a first link-state packet in Intermediate System-to-Intermediate System protocol;
      wherein the first link-state packet includes a field for an overload bit;
      wherein the overload bit in said field is not set;
      wherein the first link-state packet comprises no adjacency information;
    interrogating a link-state adjacency table and, when only one adjacency is listed in the link-state table, sending a second link-state packet in Intermediate System-to-Intermediate System protocol;
      wherein the second link-state packet comprises adjacency information and an overload bit that is set; and
  on convergence of a forward cache, sending a further link-state packet in Intermediate System-to-Intermediate System protocol;
    wherein the further link-state packet comprises adjacency information and an overload bit that is not set.

14. An apparatus for re-establishing adjacency in an internetworked system, the apparatus comprising:
  a network interface that is coupled to the network for receiving one or more packet flows therefrom;
  a processor;
  one or more stored sequences of instructions which, when executed by the processor, cause the processor to carry out the steps of:
    i) determining that adjacency establishment is required;
    ii) transmitting a message to discover neighboring network elements;
    iii) receiving one or more messages from neighboring network elements; and
    iv) in response to the one or more received messages, generating a first link-state packet in Intermediate System-to-Intermediate System protocol;
      wherein the first link-state packet includes a field for an overload bit;
      wherein the overload bit in said field is not set;
      wherein the first link-state packet comprises no adjacency information;
    v) sending the first link-state packet;
    vi) interrogating a link-state adjacency table and, when only one adjacency is listed in the link-state table, sending a second link-state packet in Intermediate System-to-Intermediate System protocol;
      wherein the second link-state packet comprises adjacency information and an overload bit that is set; and
    vii) on convergence of a forward cache, sending a further link-state packet in Intermediate System-to-Intermediate System protocol;
      wherein the further link-state packet comprises adjacency information and an overload bit set that is not set.

\* \* \* \* \*